US006929761B2

(12) United States Patent
Gelardi et al.

(10) Patent No.: US 6,929,761 B2
(45) Date of Patent: Aug. 16, 2005

(54) MOLDED HOLOGRAM APPARATUS METHOD AND PRODUCT

(75) Inventors: John A. Gelardi, Kennebunkport, ME (US); Anthony L. Gelardi, Cape Porpoise, ME (US); Michael Thrower, Scarborough, ME (US)

(73) Assignee: Sagoma Plastics Corporation, Biddeford, ME (US)

( * ) Notice: Subject to any disclaimer, the term of this patent is extended or adjusted under 35 U.S.C. 154(b) by 313 days.

(21) Appl. No.: 10/125,472

(22) Filed: Apr. 19, 2002

(65) Prior Publication Data

US 2003/0197905 A1 Oct. 23, 2003

Related U.S. Application Data

(60) Provisional application No. 60/284,513, filed on Apr. 19, 2001.

(51) Int. Cl.$^7$ ................................................ B29D 11/00
(52) U.S. Cl. ...................... 264/1.31; 264/2.2; 264/40.6; 425/144; 425/547; 425/555; 425/808
(58) Field of Search ................................ 425/385, 468, 425/808, 577, 555, 144, 547; 264/1.1, 1.31, 2.5, 2.2, 328.7, 40.6; 359/1, 19

(56) References Cited

U.S. PATENT DOCUMENTS

| 4,199,316 A | * | 4/1980 | Bradbury .................... 425/577 |
| 4,284,591 A | | 8/1981 | Neffe |
| 4,477,328 A | | 10/1984 | Broeksema et al. |
| 4,842,508 A | * | 6/1989 | Boskovic .................... 425/468 |
| 5,003,915 A | | 4/1991 | D'Amato et al. |
| 5,013,494 A | | 5/1991 | Kubo et al. |
| 5,044,707 A | | 9/1991 | Mallik |
| 5,071,597 A | | 12/1991 | D'Amato et al. |
| 5,085,514 A | | 2/1992 | Mallik et al. |
| 5,128,779 A | | 7/1992 | Mallik |
| 5,142,383 A | | 8/1992 | Mallik |
| 5,145,212 A | | 9/1992 | Mallik |
| 5,164,227 A | | 11/1992 | Miekka et al. |
| 5,411,296 A | | 5/1995 | Mallik |
| 5,538,674 A | | 7/1996 | Nisper et al. |
| 5,567,362 A | | 10/1996 | Gruen |
| 5,629,070 A | | 5/1997 | Korth |
| 5,729,365 A | | 3/1998 | Sweatt |
| 5,820,793 A | | 10/1998 | Yamaguchi |
| 5,835,245 A | | 11/1998 | Robillard et al. |
| 5,861,113 A | | 1/1999 | Choquette et al. |
| 5,956,164 A | | 9/1999 | Waitts |
| 6,005,691 A | | 12/1999 | Grot et al. |
| 6,017,657 A | | 1/2000 | Mentz et al. |
| 6,021,106 A | | 2/2000 | Welch et al. |
| 6,070,724 A | | 6/2000 | McCool |
| 6,088,161 A | | 7/2000 | Lee |
| 6,156,242 A | | 12/2000 | Saito et al. |
| 2002/0015836 A1 | | 2/2002 | Jonza et al. |

FOREIGN PATENT DOCUMENTS

| JP | 2079489 | 4/1987 |
| JP | 2080028 | 4/1987 |
| JP | 2080029 | 4/1987 |
| JP | 2119100 | 5/1987 |
| JP | 2121025 | 6/1987 |
| JP | 2146624 | 6/1987 |
| JP | 2233234 | 10/1987 |
| JP | 4090318 | 3/1992 |
| JP | 4264214 | 9/1992 |

* cited by examiner

*Primary Examiner*—Mathieu D. Vargot
(74) *Attorney, Agent, or Firm*—James Creighton Wray; Meera P. Narasimhan

(57) ABSTRACT

Holographic lines are formed directly on products by holding a holographic plate and a block under a lip on a frame and mounting the frame for limited movement within a recess in a mold half. As a mold cavity is filled, the frame, block and plate and heating tubes connected to the block move in the recess. As the product sets, springs push the frame, block and plate toward the shrinking product controlling the fine holographic lines. Lateral frame recesses receive bolt ends to limit frame travel. Partially withdrawing bolts and removing the tubes releases the frame for withdrawing the block and replacing the holographic plate.

28 Claims, 7 Drawing Sheets

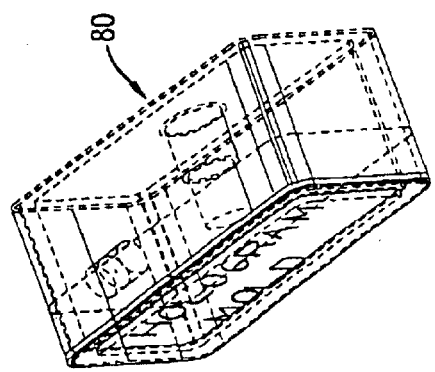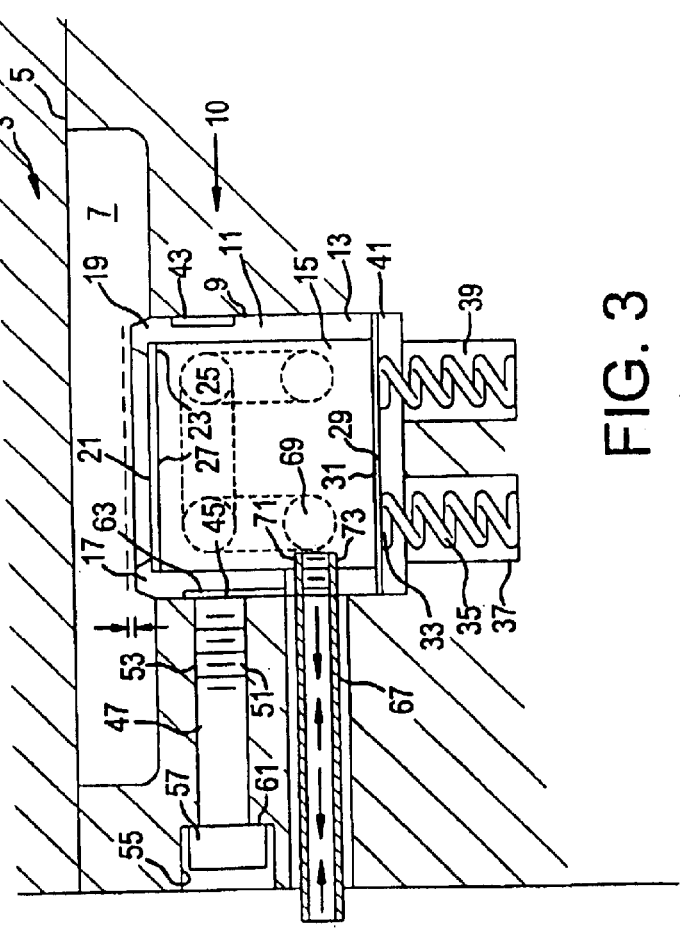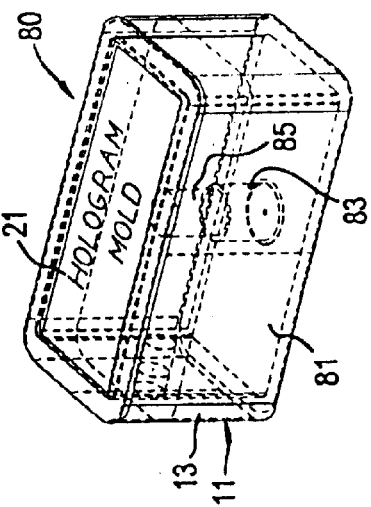

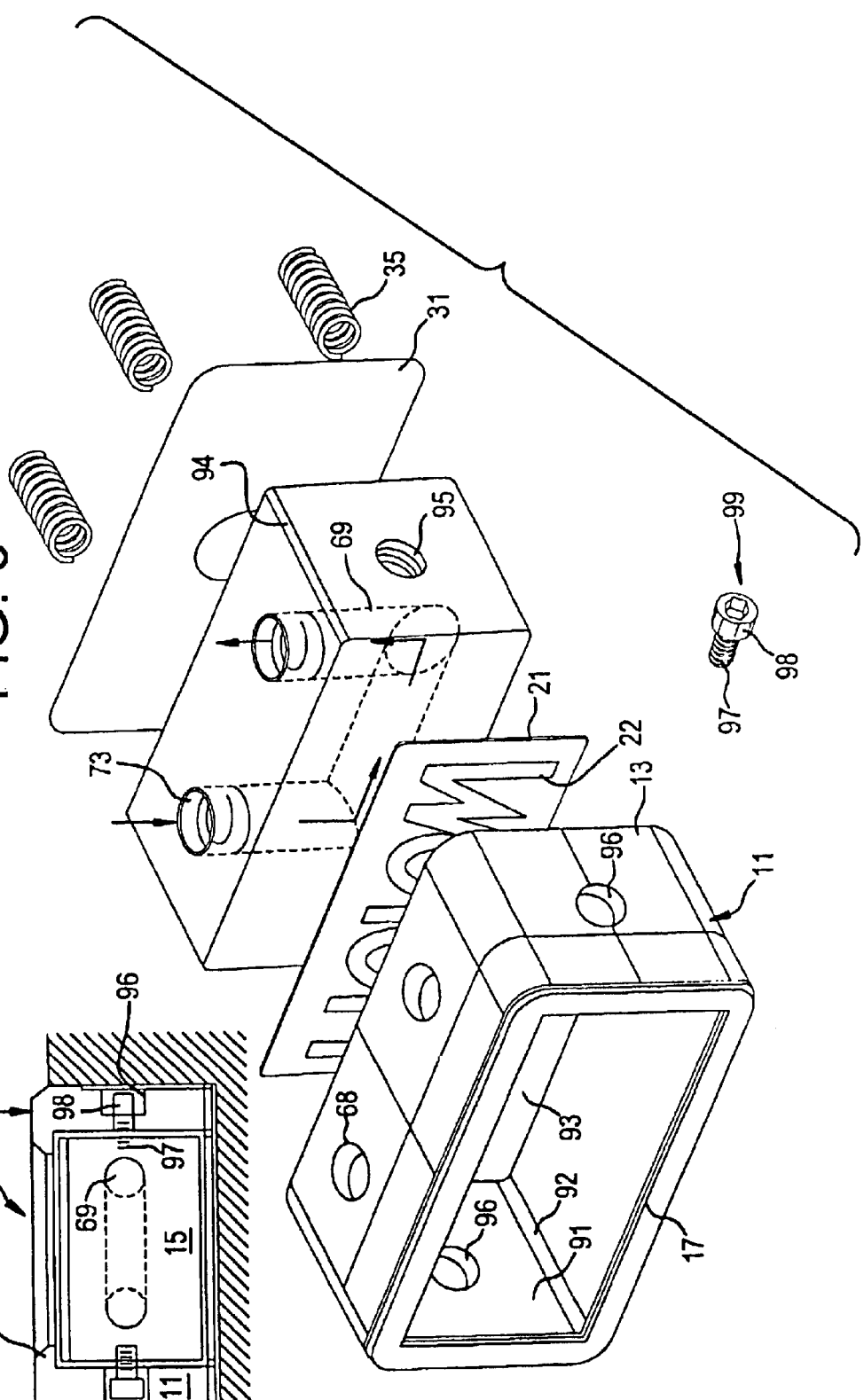

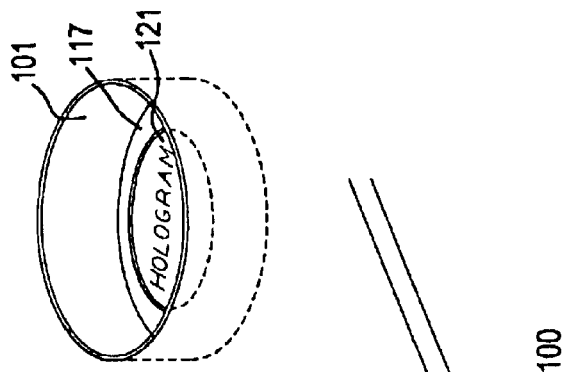
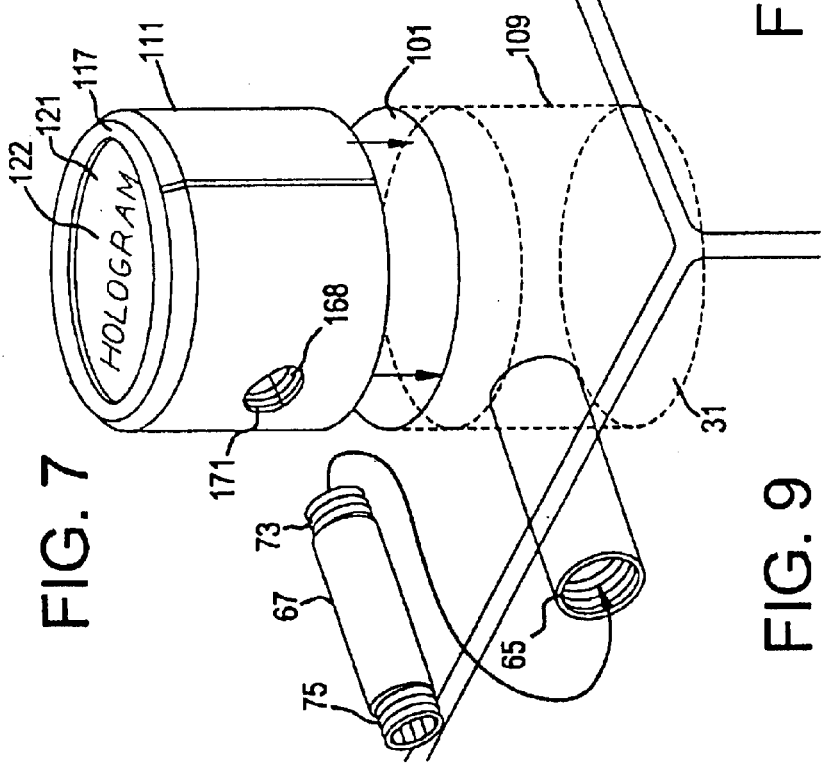
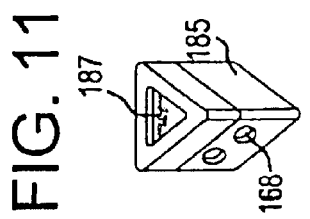
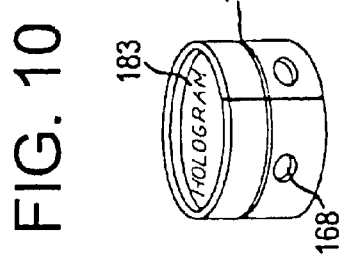
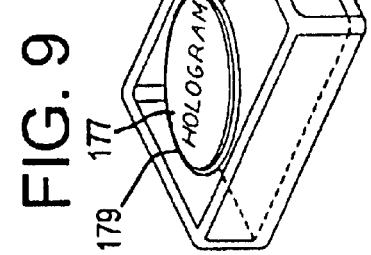

MOLDED HOLOGRAM APPARATUS METHOD AND PRODUCT

This application claims the benefit of U.S. Provisional Application No. 60/284,513, filed Apr. 19, 2001.

BACKGROUND OF THE INVENTION

Holographic images are well known. The holographic images may be used for decoration or security purposes. Holographic images may be found in credit cards, where they are often found in films laminated within the cards. Currency may have holographic images. Products and parts of products may have holographic images to avoid counterfeiting. When film is used for the holographic images, problems of counterfeiting continue. Recent attempts have been made to incorporate holographic images directly in the surface of products. Holographic films are created and etched, leaving irregular surfaces. Metal films are sputtered on the irregular surfaces of the films, and the films are removed, leaving an irregular surface on the metal.

Difficulties with quality of the holograms on surfaces of the articles persist in holographic images produced by in molded holograms.

Needs exist for improved molding processes and improved dies for producing enhanced holographic images from holograms formed in product surfaces.

SUMMARY OF THE INVENTION

The invention fulfills the needs of the prior art and produces better, clearer holograms directly on products and parts, which produce better holographic images when viewed.

In preferred embodiments of the invention, hologram shim insert plates are held mechanically on mold inserts. Removing the insert assemblies, and separating insert plugs from insert frames separates the hologram plates from the insert assemblies for easy replacement.

New methods of molding produce better holograms. The methods are useful in forming products by molding, injection molding, coating and vacuum or pressure forming.

In preferred embodiments, hologram insert plates are placed in hologram insert assemblies which are held in pockets in die surfaces. Heat is precisely controlled on the insert plate by heating and controlling heat in the insert assembly. The insert assembly is resiliently mounted within the pocket in preferred embodiments.

Forming materials in a closed die assembly under pressure forces the die insert assembly elements to compress. As injection pressure is removed from the dies and the product sets, the product begins to shrink within the die cavity. The resilient mounting of the heated insert assembly follows the surface of the part with the insert plate as the part shrinks, transferring the precise lines on the inset plate to the surface of the cooling product.

The resiliency is provided by cushioning material and springs in preferred embodiments. Alternatively, or conjointly, the resiliency is provided hydraulically or pneumatically.

The hologram molded into the part produces apparent color in non-colored parts. In a preferred embodiment, the hologram is molded into a clear formed product and is used in conjunction with print. At a greater portion of angles of viewing, the observer sees only the print. At appropriate angles of alignment and with incident light, the observer sees a holographic image as a dominant feature of the product surface.

In one preferred embodiment, holograms are impressed on opposite surfaces of a clear, transparent or translucent part. Using a correct angle of viewing, the observer sees a holographic image within another holographic image. Alternately, each layer of a multi-layer part formed of clear, transparent or translucent layers has a hologram molded into at least one surface. Viewing the product at appropriate viewing angles makes the observer see holograms within holograms. In all cases the holograms are subtle, and the observer does not see the holographic images until proper alignment is achieved.

The invention provides the forming of shapes that have holographic images molded in entire surface areas.

The invention provides a means of inserting and removing holographic dies in the forming tools. The invention provides an independent controller to regulate holographic insert temperature. One of the important features of the invention is the provision of coining the holographic image in the forming process. The invention provides the use of multiple holographic images formed by holograms on one or more layers.

These and further and other objects and features of the invention are apparent in the disclosure, which includes the above and ongoing written specification, with the claims and the drawings.

BRIEF DESCRIPTION OF THE DRAWINGS

FIG. 1 is a schematic cross-sectional representation of a mold insert for producing the hologram in a molded part.

FIG. 2 is a perspective detail of the mold insert.

FIG. 3 is a perspective top view of a mold insert.

FIG. 4 is a perspective side view of the mold insert.

FIG. 5 is a partial sectional schematic view of a mold insert in a mold.

FIG. 6 is an exploded view of a mold insert.

FIG. 7 is an exploded perspective view of a mold insert.

FIG. 8 is a detail of a round insert such as shown in FIG. 7.

FIG. 9 is a detail of a round hologram surface in molded part.

FIG. 10 is a perspective view of an oval hologram insert.

FIG. 11 is a perspective view of a triangular hologram insert.

DETAILED DESCRIPTION OF THE DRAWINGS

Figure 13:
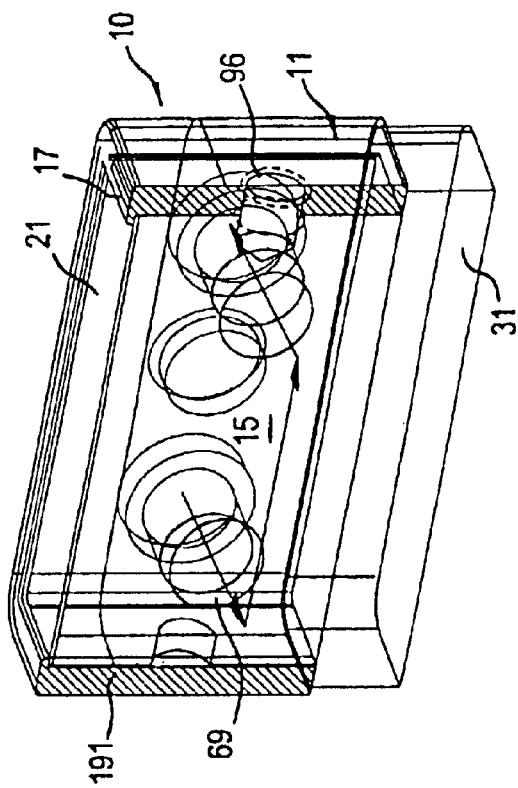
FIG. 13 is a sectional side perspective view of an in-mold hologram inserted assembly.

Referring to the drawings, FIG. 1 shows the cross section of a mold 1 having an upper half 3 and a lower half 5 with a mold cavity 7 formed between the halves.

In-mold hologram insert assembly 10 is inserted in a recess 9 in the lower half. The mold insert 10 has an outer frame 11, with sidewalls 13 surrounding an insert plug 15. The side walls 13 have inward extensions 17 at their tops 19 to hold the hologram shim 21 on top of the plug 15, by engaging outer edge portions 23 of the shim which overlie outer edge portions 25 of the upper surface 27 of the mold plug 15. The lower surface 29 of the mold plug is supported on a compression layer plate 31, which is contacted by the tops 33 of four or more springs 35 which are contained in cylinders 37 at the bottom of recess 9 in the lower mold half 5. In addition to or instead of the springs 35 the cylinders 37 have volumes 39 filled with air or hydraulic fluid under pressure.

A compressible recovery material 41 which may be a resilient elastomeric material or a spring plate underlies the plug and preferably underlies the frame to cooperate with the springs 35 and air or hydraulic fluid in cylinders 39. Pressure in the mold tends to move the frame 11 and plug 15 downward in the recess 9 during injection of material in the mold cavity 7. After injection the plug or plug and outer frame move upward to follow the molded part as any shrinking of the molded part occurs, thereby pressing the hologram and shim continuously against the molded part until the molded part is fully set and is removed from the mold cavity 7 after opening the mold halves 3 and 5.

An outer portion of the outer frame 11 has vertically extended recesses 43 which cooperate with the extended ends 45 of retaining bolts 47 to restrict relative movement of the insert assembly 10 in the recess 9. Retaining bolt 47 is inserted in a bore 49 and has male threads 51 which cooperate with female threads 53 at the bottom of the bore to hold the bolt 47 in the bore 49. A counter bore 55 receives the head 57 of the bolt 47. The base 59 of the counterbore 55 cooperates with the inner surface 61 of the bolt head 57 to position the bolt and to allow a clearance 63 between the end 45 of the bolt and in the groove 43 in the frame 11. Thus, the frame 11 and the plug 15 are free to move within the limits of the grooves 43.

Enlarged bores 65 in the sides of the lower mold half 5 receive temperature control tubes 67. Fluid flows through the tubes 67 into and out of channels 69 in the mold plug 15 to precisely maintain temperature of the mold plug 15 and of the hologram shim 21, which is supported on the upper surface 27 of the mold plug 15.

The temperature control tubes include male threads 61 which are engaged in female threads 73 within the mold plug 15. Outer threads 75 are provided for connection to temperature controlled fluid sources and returns.

As shown in FIG. 2, two tubes 67 are provided. The first tube 77 is the inlet which connects to a pressurized source of hot fluid, and the second tube 79 is an outlet tube which connects to a return on the hot fluid heater.

The heated fluid may be a gas, hydraulic oil such as used to press mold halves together, pressurized water or steam.

Partial removal of the retaining bolt 47 allows removal and replacement of the insert assembly 10. When inserted, the retaining bolt allows insert frame assembly to be held in the recessed pocket 9 in the mold 5, but also allows the insert assembly 10 to move in and out to remain in contact with the molded part.

By draining the fluid through the temperature control tubes, removing the temperature control tubes, and by partially removing the retaining bolt, the insert assembly 10 with the hologram shim plate 21 may be removed and replaced without taking the mold apart. When the insert assembly 10 is inserted in the mold pocket recess 9, the retaining bolt is tightened, and the tubes 67 are attached. The insert assembly maintains surface contact with the molded plastic material in the mold cavity throughout the entire molding process, thus maintaining the hologram image shim plate in contact with the molded part.

Maintaining the contact coins the image into the molded part.

FIGS. 3 and 4 show moveable insert assembly 80 with frame 11 having walls 13 and a moveable plug 81. A spring or piston within recesses 83 and 85 moves the plug 81 and hologram shim plate 21 and frame 11 upward. The moveable insert assembly 80 allows the insert assembly and hologram shim plate 21 to keep contact with a surface of the molded plastic part as it cools after injection into the mold.

In most thermal plastic materials, the resins are injected into the mold in liquid form. The liquid sets to a solid and cools, which is usually accompanied with shrinking. The moveable insert assembly keeps the hologram plate 21 in contact with the plastic part as it cools, coining the hologram image into the part.

In other molding processes, heated material may be placed in a mold, and the mold closed on the heated material. The heated material may shrink as it cools and solidifies. The moveable insert assembly allows the insert assembly to keep contact with the surface of the plastic as it cools, coining the hologram image from the hologram shim plate 21 into the surface of the molded part.

As shown in FIGS. 5 and 6, four or more springs 35 and compressible layer 31 urge the insert plug 15 and hologram shim 21 with its hologram image surface 22 and the frame 11 toward the mold cavity. The insert springs and compressible layer allow the insert assembly to move and recover. Water or oil flows through the internal chambers 69 of the inner plug 15 to heat or cool the insert. The temperature controlled insert plug 15 presses the hologram shim 21 and the hologram image into the molded part and follows the molded part as the part shrinks in the mold cavity.

The internal walls 91 of the frame 11 and rounded corners 92 cooperate with the smooth walls and rounded corners 94 of the inner plug 15 to allow the inner plug and hologram shim 21 to be removed and replaced in the frame 11. The inner plug 15 has threaded holes 95, and the frame has enlarged bores 96 which receive respectively the threaded end 97 and the head 98 of set screws 99. Holes 68 in the sidewalls 13 of frame 11 receive the tubes 67 shown in FIG. 2 with ends of the tubes threaded into tapped openings 73 in the insert plug 15.

FIG. 7 shows a lower mold half 100 with a round dark cavity 101. A compressible layer 31 may be provided at the bottom of the circular recess 109. A spring assembly may be provided beneath the compressible layer 31. A cylindrical outer frame 11 surrounds a cylindrical inner plug, which supports a hologram shim 121 with a hologram image 122 against the inward extending lip 117 of the frame 111. Tube 67 with end connectors 73 and 75 fits within an enlarged bore 65 in the mold half 100, extends through bore 168 in the cylindrical frame 111 and engages threads 171 in the inner plug.

FIG. 8 is a detail of the frame, rim 117 and hologram shim 121 within the cylindrical cavity 101.

FIG. 9 shows a molded part 175 with a hologram surface 177 and a cylindrical depression 179 around the hologram surface. FIG. 10 shows an oval frame 181 with an oval hologram shim 183. FIG. 11 shows a triangular frame 185 with a triangular hologram shim 187.

Figure 12:
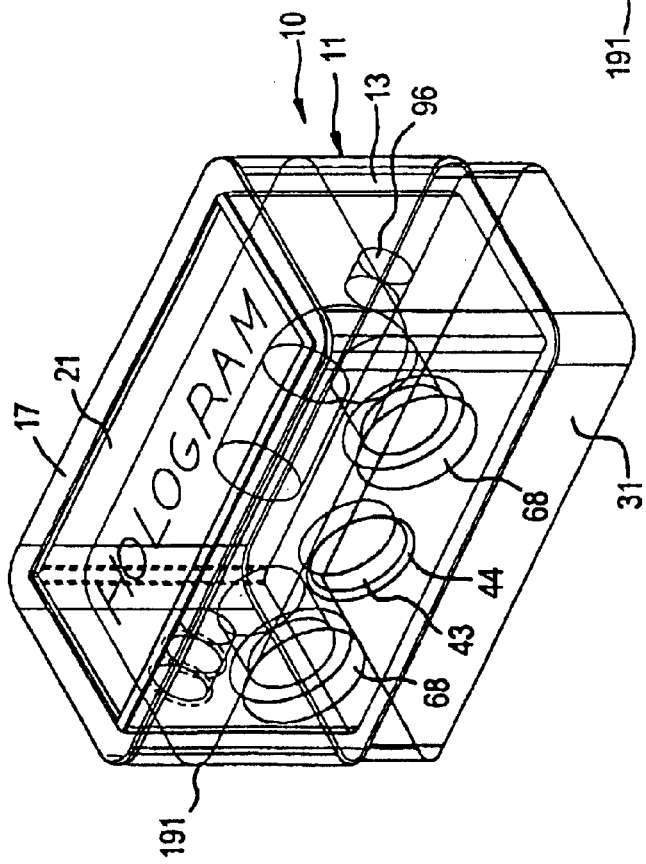
FIG. 12 is a perspective view of an in-mold hologram insert assembly.

FIGS. 12 and 13 show a schematic representation of an assembled insert assembly 10 with a frame 11 having sidewalls 13. An insert plug 15 is shown inserted in the frame with a hologram shim plate 21 positioned below the lip 17 of the frame. The frame includes bores 68 for insertion of heating and cooling tubes, and a guide 43 having a chamfered countersink 44, which loosely receives the retaining bolt 47 as shown in FIG. 1.

The holographic shim 21 is supported by the temperature-controlled plug 15 and is held beneath the rim 17 of the frame 11. As shown, a ridge 191 may be formed around the frame for cooperating with a complementary surface feature in the mold recess 9 which receives the insert assembly to prevent excessive movement of the assembly 10 into the recess.

Figure 14:
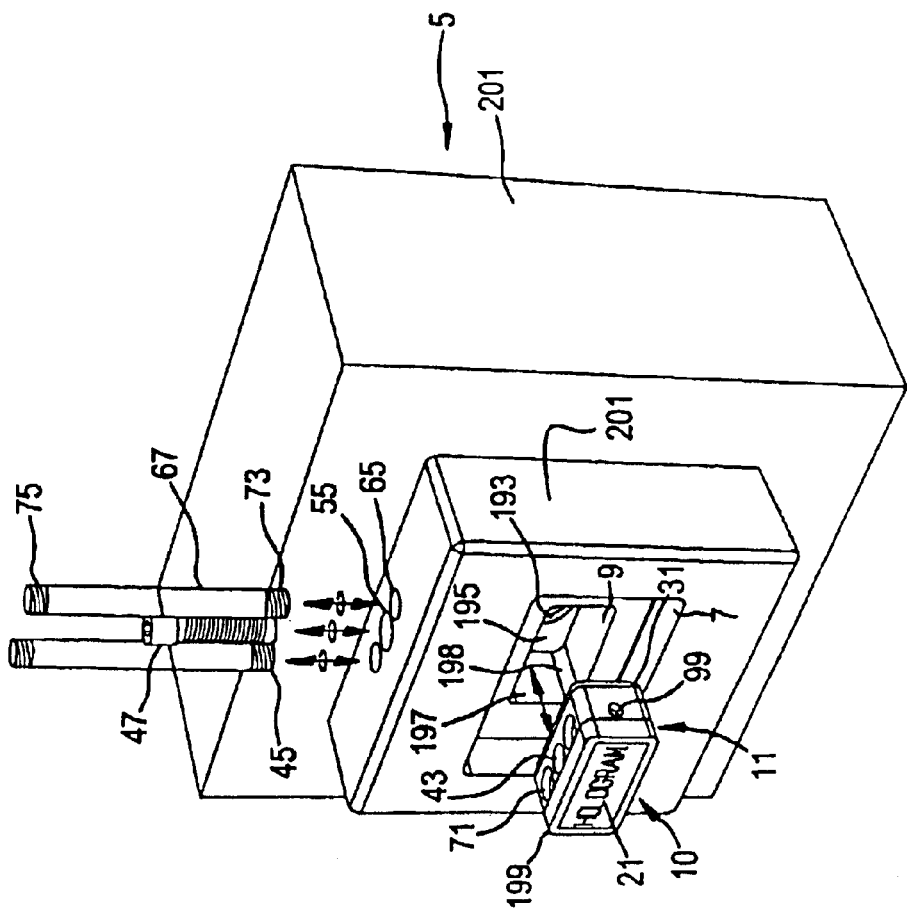
FIG. 14 shows a mold half with an insertable hologram assembly.

FIG. 14 shows the mold assembly 10 being inserted into a recess 9, which has a spring or piston holder 193 in its base 195 to cooperate with compressible layer 31. Walls 197 of the recess have curved corners 198 to cooperate with the curved corners 199 of the insert assembly frame 11. The mold half 5 has a large base 201, and a smaller portion 203, in which the mold cavity 7 is formed. Retaining bolt 47 is inserted through counterbore 55 to engage internal threads. The end 45 of the retaining bolt 47 fits loosely in retaining recess 43 to allow inward and outward movement of the hologram insert assembly 10 during molding. Tubes 67 fit loosely within bores 65 and have joining ends 73 which are connected to internal threads 71 within the insert plug. Set screws 99 hold the insert assembly 10 assembled.

The described apparatus provides a device and a method for inserting and removing a hologram shim plate into and out of a part forming device. The invention provides a device and method for holding a hologram shim and for continuing to press the hologram shim against the part during the forming, cooling and shrinking of the part. The invention also provides the above systems in combination with the addition of an independent temperature control device for controlling the temperature of the hologram insert plug and the hologram shim.

The hologram insert assembly retaining screw 47 allows slight movement of the hologram assembly 10 during the molding operations.

Figure 15:
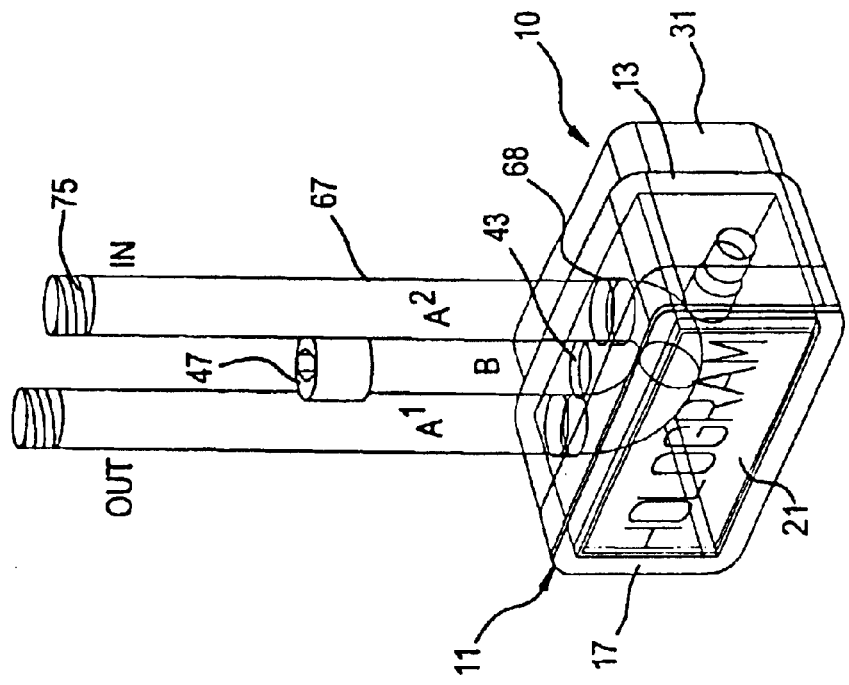
FIG. 15 shows a partially assembled in-mold hologram insert assembly showing how the temperature control tubes and retaining device are connected to the insert after the insert is placed in the mold half.

FIG. 15 schematically shows connections of the retaining bolt 47 and the temperature control tubes 67 with respect to the hologram insert assembly 10. The tubes 67 extend through bores 68 in the frame walls 13 into threaded receivers in the insert plug 15. The end of the retaining bolt 47 is positioned with clearance in the receiver 43 in the wall 13 of the frame 11 to limit movement of the hologram insert assembly 10 during molding.

After the insert assembly is placed in the mold, the temperature control system tubes 67 are inserted through the mold and the frame wall into the insert plug. The hologram retaining bolt 47 is inserted through the mold into the receiver 43 in the wall 13 of frame 11 to allow limited movement, the insert assembly 10 within the recess in the cavity.

Figure 16:
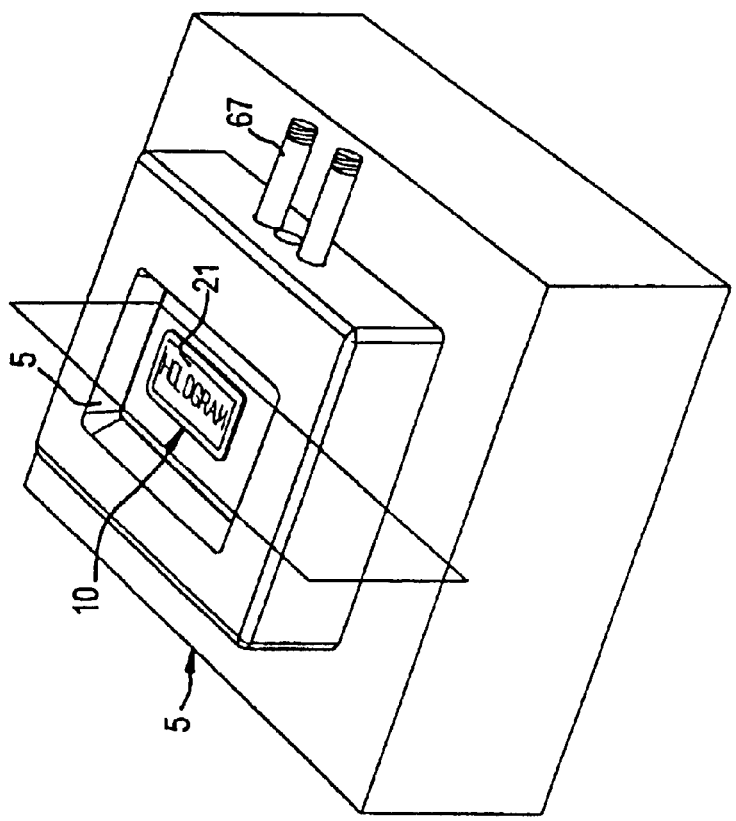
FIG. 16 is a perspective detail of the in-mold insert.

FIG. 16 shows the hologram insert assembly mounted in the recess in the cavity 7 of the mold half 5.

Figure 17:
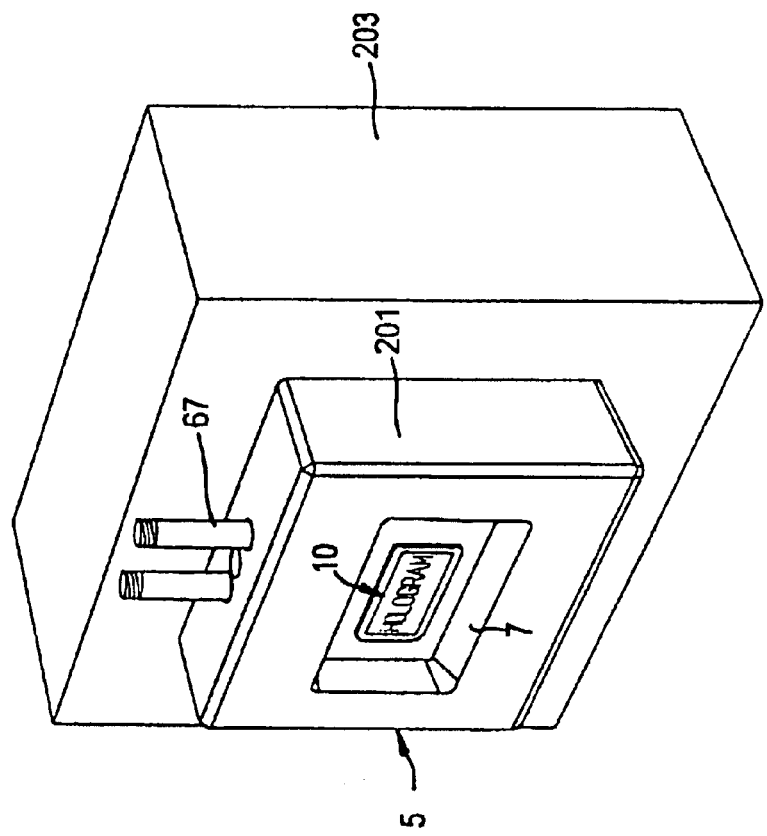
FIG. 17 is a sectional view of the insert shown in FIG. 16.
Figure 20:
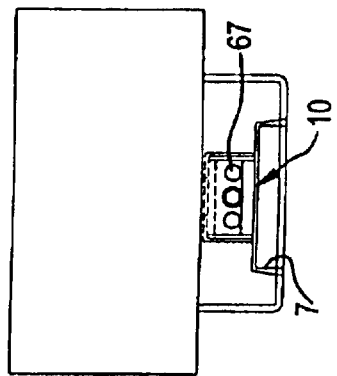
FIG. 20 is a perspective view of the mold insert mounted in the mold half.
Figure 23:
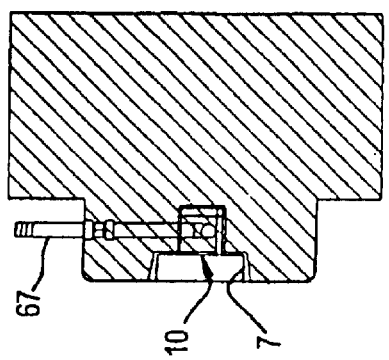
FIG. 23 is a top plan view of a mold insert in a mold half.
Figure 19:
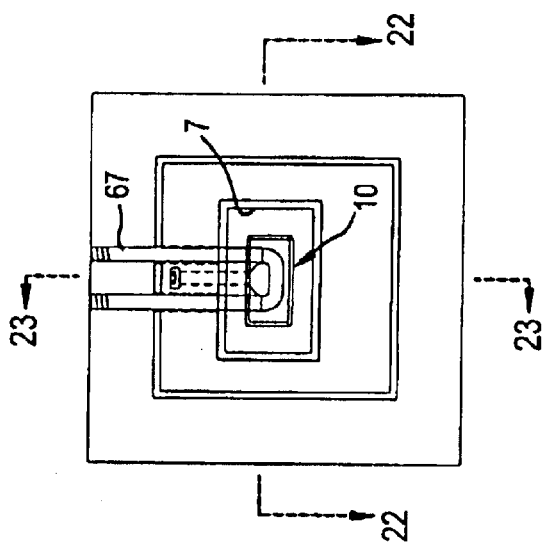
FIG. 19 is an exploded view of the mold half and platen, the insert, and the tubes and retainer ready for connection with the mold insert.
Figure 22:
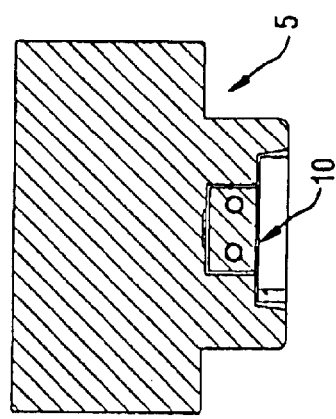
FIG. 22 is a perspective view showing details of a mold insert in a mold half.
Figure 18:
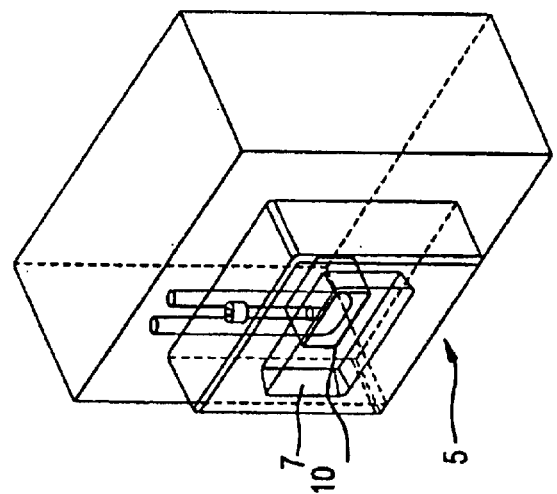
FIG. 18 is a perspective view of the insert assembly showing the connection of the temperature control tubes and retainer.
Figure 21:
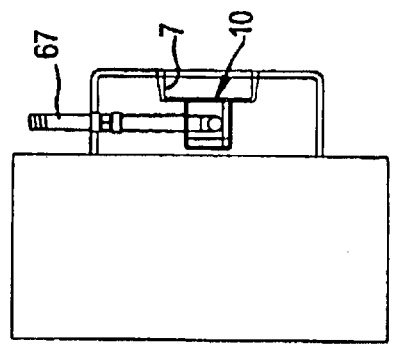
FIG. 21 is a top perspective view of a mold insert mounted in a mold half.

FIG. 17 shows the mold half 5 positioned for receiving the upper mold half to close the cavity 7.

FIGS. 18 through 23 are details showing the hologram assembly mounted in the recess 9 of the cavity 7 in the lower mold half 5.

While the invention has been described with reference to specific embodiments, modifications and variations of the invention may be constructed without departing from the scope of the invention, which is defined in the following claims.

We claim:

1. Holographic image forming apparatus comprising:
a frame for movably mounting in a recess in a mold;
a supply for filling the mold with molding material;
a block held in the frame;
a holographic plate mounted on the block in the frame; and
a force producer mounted in the recess beneath the block for urging the block outward in the mold.

2. The apparatus of claim 1, wherein the force producer comprises multiple springs in multiple cylinders at a bottom of the recess.

3. The apparatus of claim 1, wherein the force producer comprises a spring pad in a bottom of the recess.

4. The apparatus of claim 1, wherein the force producer comprises a resilient material in a bottom of the recess.

5. The apparatus of claim 1, wherein the force producer comprises a fluid-filled expansible chamber at a bottom of the recess.

6. The apparatus of claim 5, wherein the force producer further comprises a variable pressure source connected to the chamber.

7. The apparatus of claim 1, further comprising a lip on the frame overlying the holographic plate.

8. The apparatus of claim 1, wherein the force producer is mounted beneath the frame for moving the frame outward in the mold.

9. The apparatus of claim 8, further comprising lateral recesses in the frame and projections extending into the lateral recesses for limiting movement of the frame within the mold recess.

10. The apparatus of claim 9, wherein the projections are bolt ends extending into the lateral recesses from the mold, providing removal of the frame from the recess in the mold by withdrawing the bolt ends from the lateral recesses.

11. The apparatus of claim 1, further comprising a temperature controlling element in the block and at least one connector extending from the temperature-controlling element and the block and through the recess in the mold.

12. The apparatus of claim 11, further comprising at least one opening in a wall of the recess for extending the at least one connector out of the recess.

13. The apparatus of claim 1, further comprising a fluid conduit channel extending through the block for circulating temperature control fluid through the block.

14. The apparatus of claim 13, further comprising at least one tube extending from the fluid conduit channel out of the block and through a wall of the recess in the mold within at least one complementary opening which is larger than the tube for allowing movement of the tube in the opening.

15. The apparatus of claim 14, wherein the at least one tube extends laterally from the block, and wherein the at least one complementary opening is in a lateral wall of the recess in the mold.

16. The apparatus of claim 1, wherein the force producer is mounted beneath the frame for moving the frame outward in the mold, further comprising lateral recesses in the frame, bolt ends extending into the lateral recesses from the mold for limiting movement of the frame within the mold recess, and providing removal of the frame from the recess in the mold by withdrawing the bolt ends from the lateral recesses, a fluid conduit channel extending through the block for circulating temperature control fluid through the block, and tubes extending from the fluid conduit channel and laterally from the block and through a lateral wall of the recess in the mold within complementary openings which are larger than the tubes for allowing movement of the tubes in the openings.

17. A method of making a molded product with an integral holographic section, comprising:

providing first and second mold halves;

providing a recess in the first mold half;

providing a block;

placing a holographic plate on the block;

placing the block and the holographic plate in a frame;

placing the frame in the recess;

closing the mold halves;

forming a cavity between the mold halves;

filling the cavity with molding material;

forming the product in the cavity;

urging the holographic plate toward the product in the cavity as the product sets in the cavity; and opening the mold halves and removing the product with the holographic section impressed on a surface of the product.

18. The method of claim 17, wherein the urging further comprises providing multiple springs in multiple cylinders beneath the block at a bottom of the recess, and moving the holographic plate and the block toward the product with the springs as the product sets in the cavity.

19. The method of claim 18, further comprising initially compressing the springs by moving the holographic plate and the block inward in the recess during the filling of the cavity.

20. The method of claim 17, further comprising providing a compressible pad beneath the block in a bottom of the recess.

21. The method of claim 17, further comprising providing a spring plate at a bottom of the recess.

22. The method of claim 17, further comprising providing an expansible chamber at a bottom of the recess.

23. The method of claim 17, further comprising providing a lip on the frame and holding the holographic plate and the block in the frame with the lip.

24. The method of claim 17, further comprising limiting movement of the frame within the recess by providing lateral recesses in the frame and extending projections from the first mold half into the lateral recesses.

25. The method of claim 24, wherein the extending projections comprises extending bolt ends from the first mold half into the lateral recesses and withdrawing the bolt ends from the lateral recesses for removing the frame, the block and the holographic plate from the recess.

26. The method of claim 17, further comprising controlling heat of the block and the holographic plate by a heat control element in the block and at least one connector extending from the element through a wall of the recess.

27. The method of claim 17, further comprising extending a fluid conduit through the block and controlling temperature of the block and the holographic plate with fluid in the fluid conduit, providing tubes extending from the conduit through openings in a wall of the recess, and circulating heat control fluid through the tubes and the conduit and moving the tubes in the openings during the urging of the holographic plate toward the cavity.

28. The method of claim 27, wherein the openings are provided in lateral walls of the recess and the tubes extend laterally from the block and move across the openings during the urging of the block and the holographic plate toward the cavity.

* * * * *